United States Patent [19]
Oh et al.

[11] Patent Number: 6,053,013
[45] Date of Patent: Apr. 25, 2000

[54] APPARATUS AND METHOD FOR OVERCLADDING OPTICAL FIBER PREFORM ROD AND OPTICAL FIBER DRAWING METHOD

[75] Inventors: Seung-Hun Oh, Kyongsangbuk-do; Ki-Un Namkoong, Taegukwangyok-shi; Man-Seok Seo, Kyonggi-do; Un-Chul Paek, Kwangjukwangyok-shi; Kyung-Hwan Oh; Ghie-Hugh Song, both of Seoul; Mun-Hyun Do, Kyongsangbuk-do; Young-Joo Chung, Kwangjukwangyok-shi, all of Rep. of Korea

[73] Assignee: SamSung Electroncs Co., Ltd., Kyungki-do, Rep. of Korea

[21] Appl. No.: 09/049,030

[22] Filed: Mar. 27, 1998

[30] Foreign Application Priority Data

Mar. 27, 1997 [KR] Rep. of Korea ............... 97-10741
Mar. 29, 1997 [KR] Rep. of Korea ............... 97-11510

[51] Int. Cl.⁷ .................... C03B 37/028; C03B 37/10; C03B 37/07; C03C 25/02

[52] U.S. Cl. ..................... 65/412; 65/428; 65/377; 65/529

[58] Field of Search .............. 65/292, 412, 428, 65/489, 494, 501, 529, 377, 479

[56] References Cited

U.S. PATENT DOCUMENTS

| | | |
|---|---|---|
| 2,980,957 | 4/1961 | Hicks, Jr. . |
| 4,602,926 | 7/1986 | Harrison et al. . |
| 4,793,842 | 12/1988 | Yokota et al. . |
| 4,820,322 | 4/1989 | Baumgart et al. . |

FOREIGN PATENT DOCUMENTS

501429 A1  9/1991  European Pat. Off. .

OTHER PUBLICATIONS

David Smithgall and Daryl Myers, Drawing Lightguide Fiber, Western Electric Eng., vol. 24, No. 1, 1980.

*Primary Examiner*—Stanley S. Silverman
*Assistant Examiner*—Jacqueline A. Ruller
*Attorney, Agent, or Firm*—Robert E. Bushnell, Esq.

[57] ABSTRACT

There are provided an optical fiber rod overcladding apparatus and method, and an optical fiber drawing method. In the preform rod overcladding method, a preform rod is clamped in a top chuck and leveled, and a glass tube is mounted in a bottom chuck and leveled. The preform rod is coaxially inserted into a glass tube. Then, the glass tube is preheated by the furnace and heated by the burner until the glass tube reaches a softening point. The preform rod is completely sealed in the glass tube by sucking air in a clearance between the preform rod and the glass tube by application of a negative vacuum pressure. Thus, a preform is completed.

21 Claims, 6 Drawing Sheets

APPARATUS AND METHOD FOR OVERCLADDING OPTICAL FIBER PREFORM ROD AND OPTICAL FIBER DRAWING METHOD

CLAIM OF PRIORITY

This application makes reference to, incorporates the same herein, and claims all benefits accruing under 35 U.S.C. §119 from two applications filed in the Korean Industrial Property Office on Mar. 27, 1997 and Mar. 29, 1997, and there duly assigned Serial No. 97-10741 and 97-11510, respectively, by that Office.

BACKGROUND OF THE INVENTION

1. Field of the Invention

The present invention relates to a large-diameter optical fiber preform fabricating method, and in particular, to apparatus and method for overcladding an optical fiber preform rod, which reduces a preform fabrication time by preheating a glass tube with a furnace, heating the glass tube with an oxygen-hydrogen burner, and collapsing the glass tube onto the preform rod, and an optical fiber drawing apparatus and method which feeds a glass tube and preform rod into a furnace that applies heat to collapse the glass tube on the preform rod to form a preform and that applies heat to the preform in order to draw an optical fiber from the furnace.

2. Description of the Related Art

An optical fiber is generally fabricated in two processes: a preform rod is prepared and then a preform is fabricated by a rod-in-tube or overcladding method, in the first process; and an optical fiber having an outer diameter of 125 $\mu$m is fusion-drawn from the fabricated preform, in the second process.

The preform rod is fabricated by outside deposition or inside deposition. In the outside deposition process such as a VAD (Vapor Phase Axial Deposition) process and an OVD (Outside Vapor Deposition) process, $SiO_2$ particles called soot are deposited onto a preform rod from the outside by hydrolyzing chemical gases such as $SiCl_4$ and other dopants together with oxygen by flames, while supplying the gases to the preform rod. Then, this porous preform rod is fed into a furnace, dehydrated, and sintered, using $Cl_2$ and He, thereby obtaining a transparent preform rod. On the other hand, in the inside deposition process including a CVD (Chemical Vapor Deposition) process and a MCVD (Modified CVD) process, a plurality of layers are deposited on the inner surface of a glass tube by providing $SiCl_2$ and other dopants together with $O_2$ into the tube, and the layer-deposited glass tube is heated at a high temperature and collapsed, while supplying $Cl_2$ and He into the tube. Thus, a glass rod is obtained. The MCVD process is widely used and enables fabrication of a high-quality glass preform rod.

The MCVD and CVD processes for fabrication of an optical fiber are limited in obtaining a preform rod having a diameter of about 23 mm or above in view of their processing characteristics. Hence, to increase product yield, an overcladding method has been explored in which a glass tube is fusion-stuck to a preform rod prepared by the above inside deposition processes.

To obtain a large-diameter preform, a prepared preform rod is inserted into a large-diameter glass tube, which is then heated and collapsed onto the rod in the rod-in-tube or overcladding method, as is well known and thus will not be described in detail. This is disclosed in detail in U.S. patent application Ser. No. 08/292,977 entitled Single-Mode Primary Overcladding Method and Apparatus, and U.S. Pat. No. 4,820,322 to Jerry W. Baumgart et al and entitled Method And Apparatus For Overcladding A Glass Rod which utilizes a vertical lathe and a rod-in-tube, or overcladding, method to obtain a large-diameter preform, wherein a preform rod is inserted into a large-diameter glass tube, heated, and collapsed onto the glass tube while the pressure in the gap between the tube and rod is reduced by a vacuum. Another method described therein uses a zirconia induction furnace to collapse a tube on a rod during an optical fiber drawing operation.

Though there is no difficulty in inserting and overcladding a preform rod fabricated by the MCVD process into and with a glass tube having an outer diameter of 70 mm, the amount of heat required for overcladding increases as the outer diameter or thickness of the glass increases and, as a result, the overcladding rate of a burner for externally providing heat should slow down. The problem may be overcome by farther lowering a vacuum pressure applied to the interface between the preform rod and the glass tube, but a very large negative pressure brings about degradation of concentricity and circularity in the cross section of a preform.

On the other hand, the heat energy provided from outside can be increased simply by increasing the supply flow rate of a current oxygen-hydrogen burner. The outer surface of the glass tube is softened, however, resulting in a lower viscosity, while the inner surface thereof is rather slowly softened, keeping a predetermined viscosity. Therefore, the surface of the glass tube may be deformed by the flame pressure of the oxygen-hydrogen burner at the increased supply flow rate, or contaminating particles may adhere from the burner to the surface of the large-diameter glass tube. The oxygen-hydrogen burner cannot transfer heat sufficiently to the surface of the glass tube due to its relatively short hot zone, and brings about a non-uniform temperature distribution on the periphery of the glass tube. Hence, geometric irregularities such as ovality in the cross section of the glass tube occur, and the difference between the viscosities of the outer and inner surfaces of the glass tube increases microbending loss. Moreover, product yield is remarkably lowered because about 2–4 hours is required to fabricate a preform.

From the preform fabricated in the overcladding method, an optical fiber having an outer diameter of 125 $\mu$m is fusion-drawn at a predetermined linear velocity under a predetermined tension load. The keypoint of the drawing process is to increase productivity per unit time by increasing the linear velocity, and a current linear velocity is usually 600–1200 m/min.

However, the above optical fiber drawing method has distinct drawbacks in that mass production of optical fibers is impossible due to the low linear velocity, and product yield decreases and optical fiber cost increases by adding the overcladding process for fabrication a preform from a preform rod before drawing an optical fiber.

Other known apparatus and processes for fabricating optical fiber preforms and drawing optical fibers therefrom are discussed in U.S. Pat. No. 2,980,957 to J. W. Hicks, Jr. and entitled Method And Apparatus For Use In The Fabrication Of Light-Conducting Devices which describes an apparatus and method for collapsing a glass tube on a glass rod utilizing a vertical holding apparatus, wherein gases between the tube and rod are drawn out by a vacuum. The formed preform is than drawn out from the apparatus to form an optical fiber. U.S. Pat. No. 4,602,926 to Andrew P.

Harrison et al. and entitled Optical Fibre Fabrication which describes a method for manufacturing an optical fiber by feeding a rod and a tube into a furnace at different rates and the diameter of the fiber drawn from the furnace is monitored. U.S. Pat. No. 4,793,842 to Hiroshi Yokota et al. and entitled Method For Producing Glass Preform For Optical Fiber which describes a method for collapsing a tube on a rod to manufacture a preform, wherein the gap between the tube and rod is filled with a gaseous mixture of silicon halogenide, a fluorine-containing compound and oxygen and preheated at a temperature between 500 and 1900 degrees Celsius. After the preheating step the atmosphere in the gap is replace by a gaseous mixture of a halogen-containing compound and oxygen, one end of the tube is collapsed on the rod to form a seal and then the tube is collapsed on the rod while decreasing the pressure in the gap by means of an exhausting apparatus. And European Patent No. 501429-A1 to Masami Ito et al. and entitled Method For Producing Glass Preform Form Optical Fiber describes a process of attaching a tube and a rod to a vertical lathe, inserting the rod into the tub, filling the gap between the tube and rod with a halogen-containing gas and oxygen gas, then collapsing the tube on the rod to form an optical fiber preform.

SUMMARY OF THE INVENTION

To solve the conventional problems, a first object of the present invention is to provide an apparatus and method for overcladding an optical fiber preform rod, which prevents uniformless temperature distribution on the periphery of a glass tube by transferring sufficient heat to a glass tube by a furnace having a wide hot zone, and ensures concentricity in the cross section of a preform by stably collapsing the glass tube onto the preform rod through application of oxygen and hydrogen pressures, in fabrication of the optical fiber preform.

A second object of the present invention is to provide an apparatus and method for overcladding an optical fiber preform rod, which enables fabrication of a highly strong optical fiber by protecting the surface of the preform rod from contaminating particles with use of oxygen and hydrogen at low flow rates in fabrication of an optical fiber rod.

A third object of the present invention is to provide an apparatus and method for overcladding a preform rod, which can increase the collapsing rate of a large-diameter glass tube by five times in maximum by increasing a total heat energy in fabrication of an optical fiber preform.

A fourth object of the present invention is to provide an optical fiber preform rod overcladding method which can fabricate a preform regardless of the outer diameter of a glass tube.

A fifth object of the present invention is to an optical fiber preform rod overcladding method for simply overcladding a preform rod with a glass tube.

A sixth object of the present invention is to provide an optical fiber preform rod overcladding method which can increase the product yield of preforms.

A seventh object of the present invention is to provide an optical fiber preform rod overcladding method which uniformly softens a glass tube from an outer surface and an inner surface.

An eighth object of the present invention is to provide an optical fiber preform rod overcladding method which enables fabrication of a highly strong preform by protecting the surface of a glass tube from contaminants generated from a burner.

A ninth object of the present invention is to provide an optical fiber preform rod overcladding method which can prevent the interface between a preform rod and a glass tube from stresses by controlling the viscosity therebetween.

A tenth object of the present invention is to provide an optical fiber drawing method which can reduce an optical fiber fabrication time.

An eleventh object of the present invention is to provide an optical fiber drawing method which can draw an optical fiber successively without an overcladding process.

To achieve the above object, there is provided an optical fiber rod overcladding apparatus. The overcladding apparatus includes a vertical lathe, a chuck installed in each end of the vertical lathe, a carriage in the vertical lathe, for vertically moving between both ends of the vertical lathe, an oxygen-hydrogen burner installed in the carriage, a furnace installed in the carriage, a vacuum pump provided at an end of the vertical lathe, a coupler for connecting the vacuum pump to the end of the vertical lathe, and a controller outside the vertical lathe, for controlling the vertical movement of the carriage, the flow rate of the oxygen-hydrogen burner, and the rotation of the chucks. Here, the furnace preheats or heats a glass tube to overclad a preform rod with the glass tube.

According to another aspect of the present invention, there is provided an optical fiber preform rod overcladding method. In the overcladding method using the above overcladding apparatus, a preform rod is clamped in the top chuck and made vertical, a glass tube is mounted in the bottom chuck and the glass tube is made vertical, and the preform rod is coaxially inserted into a glass tube. The glass tube is preheated by the furnace and heated tube by the burner until the glass tube is softened. The preform rod is completely sealed in the glass tube by sucking air in a clearance between the preform rod and the glass tube by application of a negative vacuum pressure, to thereby complete a preform.

According to still another aspect of the present invention, there is provided an optical fiber drawing method. In the optical fiber drawing method, ends of a preform rod and a glass tube are sealed, the preform rod and the glass tube are supportedly clamped in a chuck provided to a feed module in an optical fiber drawing apparatus, and a vacuum pump is connected to the sealed ends thereof. The sealed ends of the preform rod and the glass tube are aligned in a hot zone of a furnace in the optical fiber drawing apparatus. Then, the glass tube is collapsed onto the preform rod by preheating the sealed ends of the preform rod by the furnace, heating the sealed ends thereof until the sealed ends thereof are softened, and sealing a clearance between the preform rod and the glass tube, thereby forming a preform. An optical fiber is drawn from the preform by the furnace, and the outer diameter of the drawn optical fiber is measured. Then, the optical fiber is cooled and coated with a curing resin.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
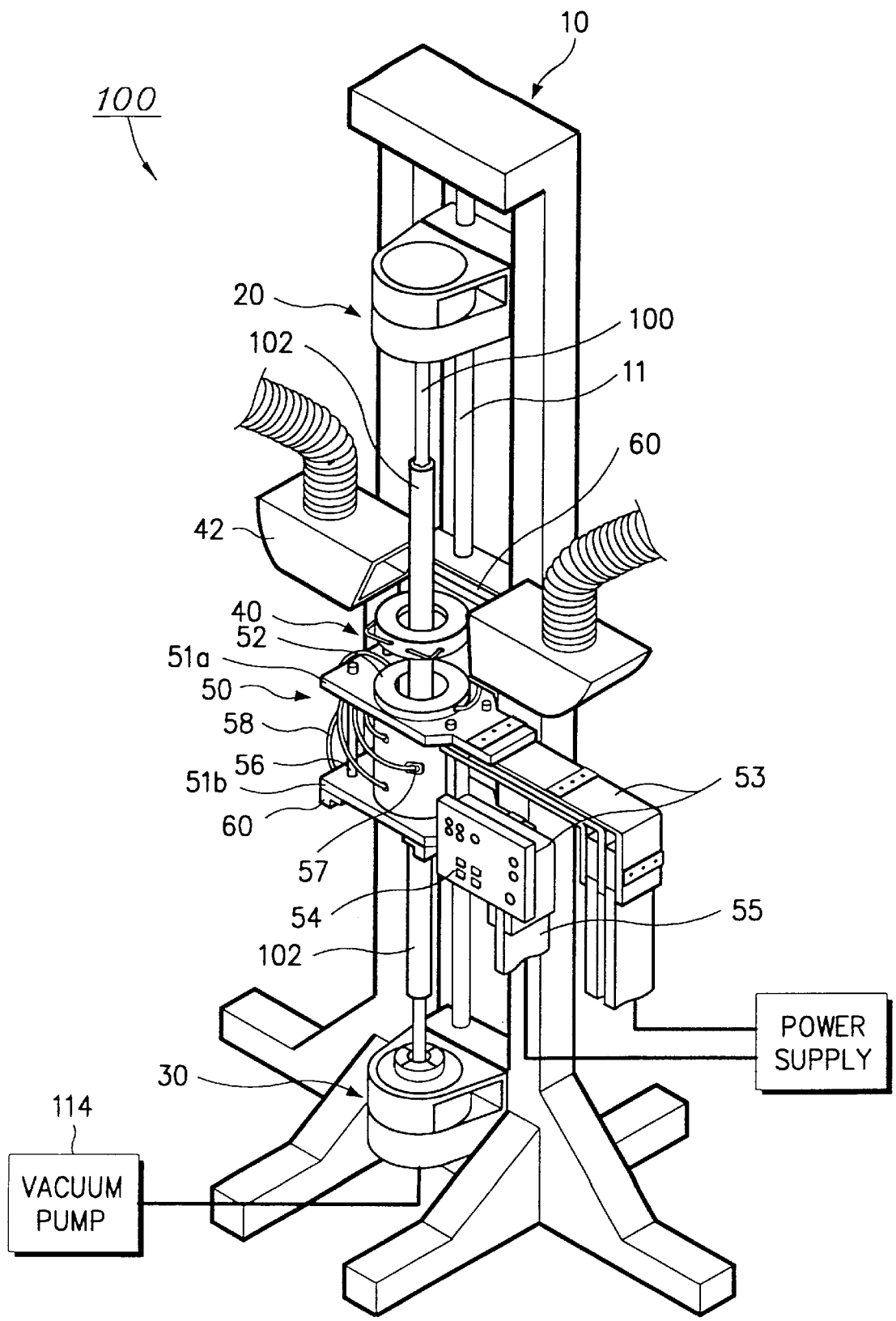
FIG. 1 is a perspective view of a furnace and overcladding apparatus according to a first preferred embodiment of the present invention, for use in fabrication of an optical fiber preform.

Referring to FIG. 1, the furnace and overcladding apparatus according to the first embodiment of the present invention has a vertical lathe 10 including: chucks 20 and 30 for vertically supporting a glass tube 102 and a preform rod 100; a carriage 60, installed in the vertical lathe 10, for vertically moving an oxygen-hydrogen burner 40 fixed to carriage 60, for heating preform rod 100 and glass tube 102; a furnace 50, disposed under burner 40 in carriage 60, for heating or preheating preform rod 100 and glass tube 102; a vacuum pump 114 connected to one end of vertical lathe 10 by a coupler; a controller (not shown) for controlling rotation of glass tube 102 connected to a support (dummy) tube 103 gripped in chuck 30, the vertical movement speed of carriage 60, the flow rate of burner 40, and the pressure of vacuum pump 114; and a power supply 12 connected to furnace 50 via bus bars 53 and cables 55, for supplying a power supply voltage to furnace 50. Components of the optical fiber preform rod overcladding apparatus as constituted above will be described in more detail below.

A guide rod 11 and a transfer means (not shown) are provided to vertical lathe 10, for vertically moving carriage 60, and the top and bottom chucks 20 and 30 are disposed at opposite ends of vertical lathe 10. Top chuck 20 is rotatably clamped to preform rod 100, while bottom chuck 30 is rotatably clamped to support tube 103 having glass tube 102 attached thereto. Carriage 60, having burner 40 fixed thereto, moves vertically along guide rod 11 in vertical lathe 10. Furnace 50 is positioned under burner 40, and a flexible ventilating duct 42 is provided above burner 40. That is, duct 42, burner 40, and furnace 50 are integrally stacked in carriage 60, and their vertical movements are controlled by the controller (not shown).

Furnace 50 has a heat emitting body of graphite therein and emits heat generally in the range of 2000–2500° C. upon receipt of a power supply voltage from power supply 12. The heat transfers to glass tube 102 and preform rod 100 by radiation and forms hot zones on them. A manipulation unit (control panel) 54 is installed along the longitudinal axis of furnace 50, to facilitate user manipulation.

Furnace 50 has a vertically longer heat emitting portion and a smaller thickness than that normally used in an optical fiber drawing process, in order to maximize transfer of radiated heat. Furnace 50 can be thinner by partially decreasing the thickness of a liner (not shown) in furnace 50. Graphite of an electrical resistance type, or zirconia ($ZrO_2$) of an induction type, is used for the heat emitting body of furnace 50. A plurality of tubes 58 are connected to furnace 50 to introduce He (helium), Ar (argon), or a mixed gas thereof (He+Ar) into furnace 50. On the top and bottom of furnace 50, cover flanges 52 and conductor flanges 51a and 51b are assembled, respectively. Conductor flanges 51a and 51b are connected to a plurality of bus bars 53, for receiving a power supply voltage via the cables 55 from power supply 12, and are firmly fixed to furnace 50 by engaging tie bars 56 in corners thereof.

The He, or Ar, gas being an inert gas is injected into furnace 50 heated at a high temperature to prevent oxidation of the graphite from occurring on the outer surface of preform rod 100 or glass tube 102, and makes heat temperature distribution uniform on the outer surface of preform rod 100 and glass tube 102 due to its excellent thermal conductivity. A pyrometer 57 having a temperature sensor therein is installed in the body of furnace 50, to sense the internal temperature of furnace 50. A cooling line (not shown) is also provided to furnace 50 to cool down furnace 50 heated at a high temperature.

The above preform rod overcladding apparatus should be installed in such a place that keeps its ambient temperature between 0–40° C. and its ambient humidity within 50%.

In the thus-constituted overcladding apparatus, the prepared preform rod 100 is clamped in top chuck 20, and is made vertical. Preferably, preform rod 100 is attached to a handle rod (not shown) of the same diameter as preform rod 100 and this handle rod is attached to top chuck 20. Then, one end of the large-diameter glass tube 102 is connected to support tube 103 which is then fixedly mounted in bottom chuck 30, and glass tube 102 is vertically leveled.

Subsequently, preform rod 100 fixed to the top chuck 20 is moved down to be coaxially inserted into glass tube 102 under the control of the controller. A hot zone of furnace 50 is positioned around a predetermined upper portion of glass tube 102 having preform rod 100 inserted therein by moving the carriage 60 under the control of the controller. Furnace 50 preheats the predetermined upper portion of glass tube 102 for 10–30 minutes with an inert gas and a power supply voltage supplied thereinto, while the combined preform rod 100 and glass tube 102 are being synchronously rotated at 20–30 rpm by driving both chucks 20 and 30 under the control of the controller. At this time, oxygen-hydrogen burner 40 turns on at an initial gas flow rate.

When the preheated portion of glass tube 102 is lowered in viscosity and softened, preform rod 100 is entirely sealed in glass tube 102 by sucking out the air in the gap between preform rod 100 and glass tube 102 using vacuum pump 114 under the control of the controller. The interface between preform rod 100 and glass tube 102 can be stress-relieved by flowing $SiCl_3$ and $O_2$ through the gap and enabling deposition of a contact material such as a glass forming material $POCl_4$ thereinto. Then, carriage 60 is moved down, and the flow rates of oxygen-hydrogen burner 40 are increased to 75 liters per minute (LPM) for oxygen and 150 LPM for hydrogen.

Carriage 60 moves downward at a slightly increasing velocity from 1 centimeter per minute (CPM) to 3–5 CPM, and thus glass tube 102 is integrally collapsed onto the whole length of preform rod 100. Then, furnace 50 is tuned off, and oxygen-hydrogen burner 40 is positioned around a connection portion between glass tube 102 and support tube 103 and softens the connection portion by heating it for 3–5 minutes with oxygen at 75 LPM and hydrogen at 150 LPM. Top chuck 20 is then moved up slowly at 1–3 millimeters per minute (mm/min) and the softened connection portion becomes thin.

When the outer diameter of a preform under fabrication reaches ⅔rds of a completed preform, the preform collapsed in the support tube 103 is completely removed from the support tube 103 by rapidly moving up the top chuck 20 using the manipulation unit 54. The completed preform is extracted from the chucks 20 and 30 and cooled down in a retainer for a predetermined time. Thus, the preform rod overcladding process is completed.

Figure 2:
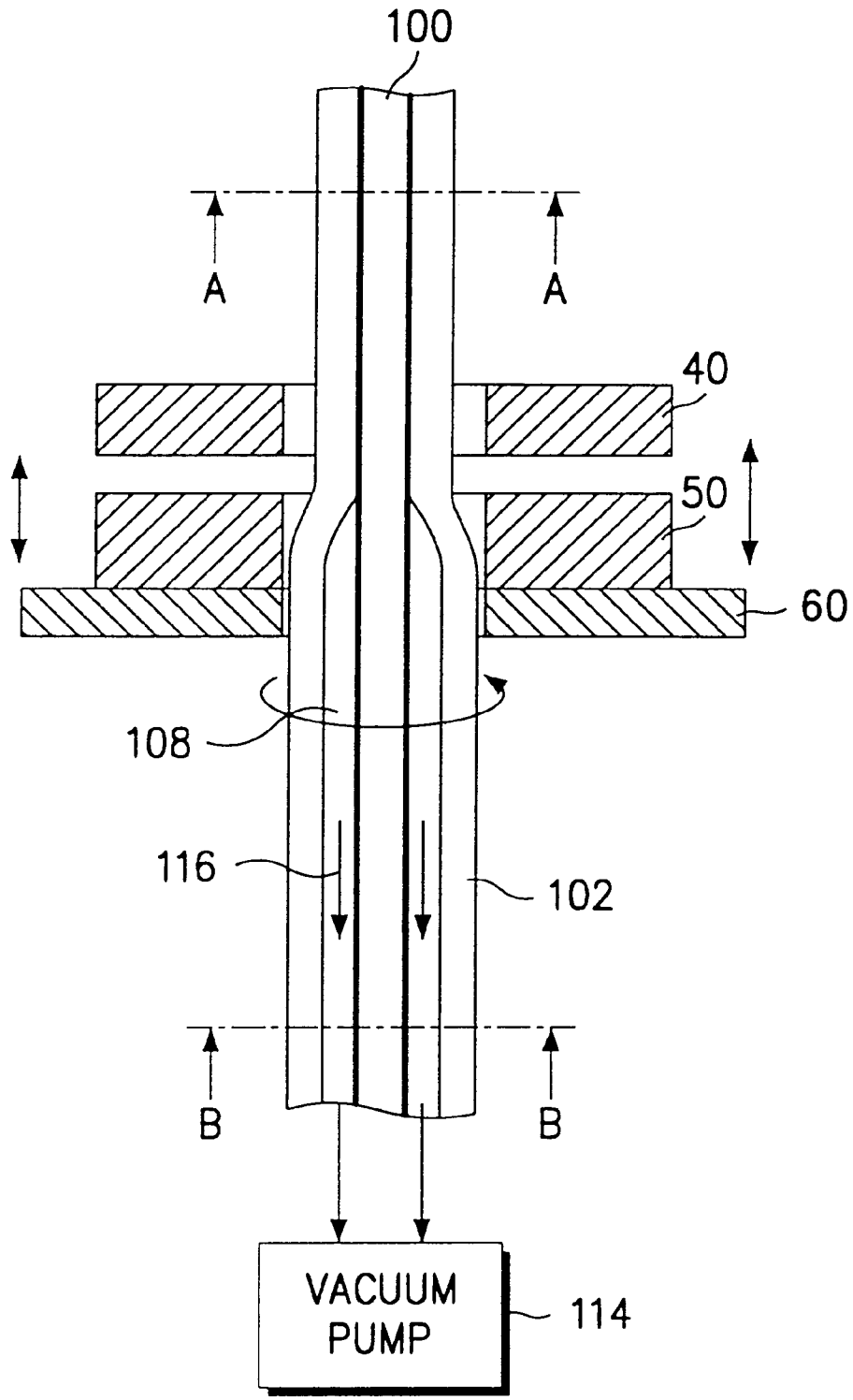
FIG. 2 is a view which depicts a process of making a preform out of a preform rod in the apparatus of FIG. 1 according to the first preferred embodiment of the present invention.
Figure 3A:
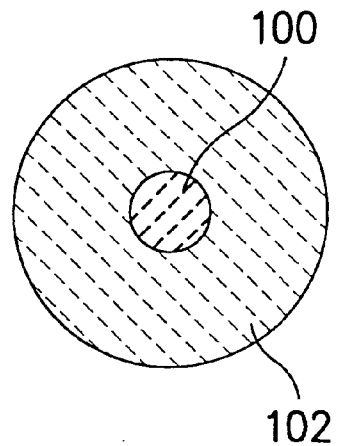
FIG. 3A is a sectional view of FIG. 2, taken along line A—A.
Figure 3B:
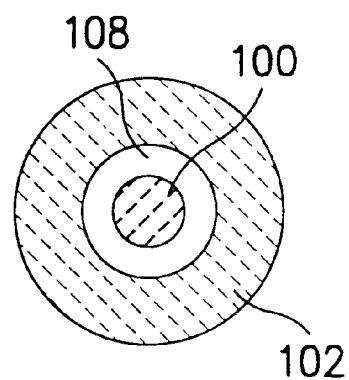
FIG. 3B is a sectional view of FIG. 2, taken along line B—B.

Referring to FIGS. 2 and 3A–3C, an overcladding process for fabrication of a preform using the above furnace and overcladding apparatus will be described. Preform rod 100 is fabricated by outside deposition or inside deposition, and glass tube 102 is a natural quartz tube or a synthesized quartz tube having an inner diameter of 10 mm, or above, and a large outer diameter. Then, preform rod 100 is clamped in top chuck 20 and vertically leveled. One end of the large-diameter glass tube 102 is connected to support tube 103, the support tube 103 is mounted in bottom chuck 30, and glass tube 102 is made vertical. Here, there is a gap 108 between preform rod 100 and glass tube 102 as shown in FIGS. 2 and 3B.

Subsequently, preform rod 100, fixed to top chuck 20, is moved down to be coaxially inserted into glass tube 102 under the control of the controller (not shown). A hot zone of furnace 50 is positioned around a predetermined upper portion of glass tube 102 having preform rod 100 inserted therein by moving carriage 60 under the control of the controller. A power supply voltage is supplied to furnace 60 and an inert gas such as Ar, He, or N is injected into the gap 108 at 5–10 LPM, while preform rod 100 and glass tube 102 are being synchronously rotated in chucks 20 and 30. When the surface of glass tube 102 reaches 1700° C., burner 40 decreases its heat temperature with oxygen at 5 LPM and hydrogen at 10 LPM and heats the surface of glass tube 102, while moving carriage 60 downward at a velocity of 3–5 CPM. Then, the inner surface of glass tube 102 is heated by heat transfer from the outer surface thereof and the inert gas, thus burning away microdust particles stuck on the inner surface thereof. Microdust particles are also burnt away from the outer surface of preform rod 100 which is heated by heat transfer from the inner surface and the inert gas.

Next, carriage 60 moves back up to again position furnace 50 over the predetermined upper portion of the glass tube 102. Glass tube 102 is then preheated for 10–30 minutes by supplying an inert gas into furnace 50 while glass tube 102 and preform rod 100 are synchronously rotated at 20–30 rpm in chucks 20 and 30. At this time, burner 40 above furnace 50 is lit with hydrogen at 30 LPM and oxygen at 15 LPM. Then, preform rod 100 and glass tube 102 are configured as shown in FIG. 3B.

Figure 3C:
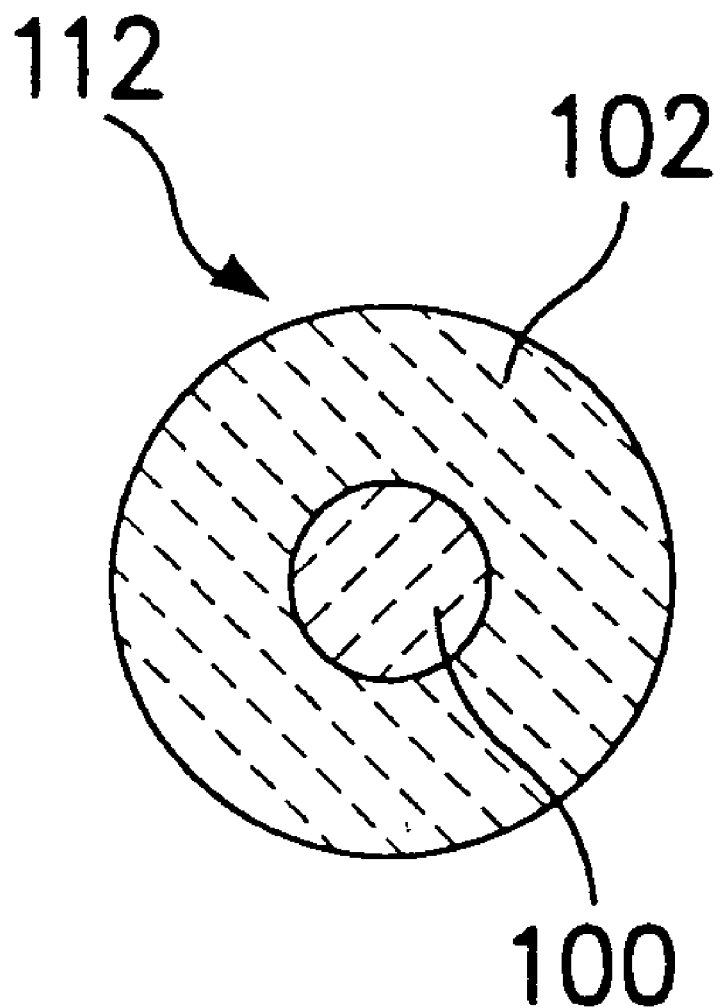
FIG. 3C is a sectional view of a preform fabricated by the apparatus of FIG. 1 according to the a first preferred embodiment of the present invention.

When the preheated portion of the glass tube 102 drops in viscosity and is softened, air is sucked away from gap 108 between preform rod 100 and glass tube 102 by driving vacuum pump 114 under the control of the controller, completely sealing preform rod 100 within glass tube 102 at one end of glass tube 102. Then, carriage 60 is moved down at a slightly increasing velocity from 1 CPM to 3–5 CPM and, simultaneously, the oxygen and hydrogen flow rates of burner 40 are increased to 75 LPM and 150 LPM, respectively, so that glass tube 102 is collapsed onto the whole length of preform rod 100, while they are rotated at a predetermined peripheral velocity. Furnace 50 is then turned off, and burner 40 is disposed around the connection portion between glass tube 102 and support tube 103 and softens the connection portion at 75 LPM of oxygen and 150 LPM of hydrogen for 3–5 minutes. When the connection portion between the support tube 103 and the glass tube 102 is softened, it becomes thin by slowly moving top chuck 20 upwards at 1–3 mm/min. When the outer diameter of a preform under fabrication reaches ⅔rds of the outer diameter of a completed preform 112, the preform 112 collapsed in support tube 103 is completely removed from support tube 103 by rapidly moving top chuck 20 upwards using manipulation unit 54, and cooled down in a retainer for a predetermined time. Thus, the overcladding process is over and preform 112 is configured as shown in FIG. 3C.

Figure 4:
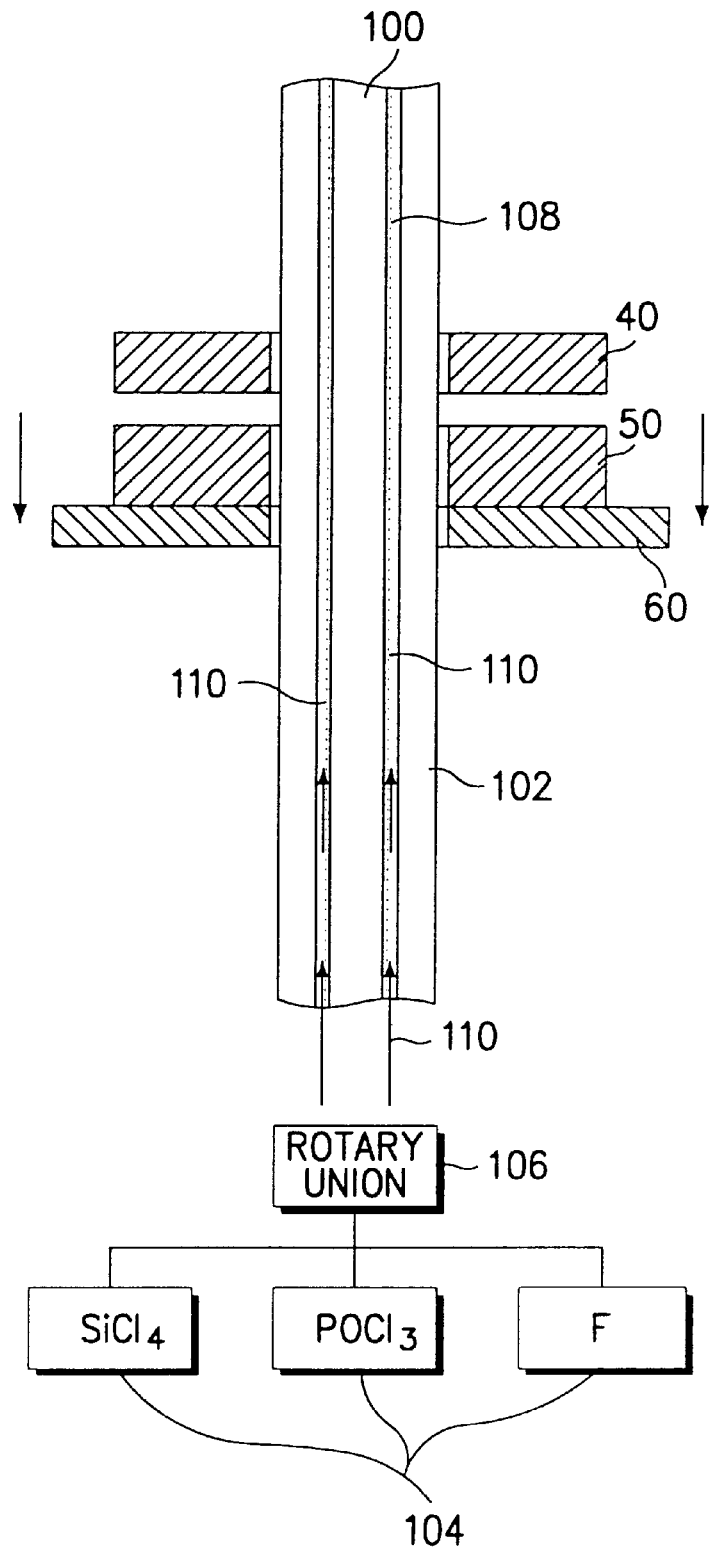
FIG. 4 is a view which depicts a process of fabricating the preform, while controlling the viscosity between a preform rod and a glass tube by injecting a glass forming material therebetween, in a furnace comprising an overcladding device according to a second preferred embodiment of the present invention.

FIG. 4 schematically illustrates an overcladding process for fabrication of a preform, controlling the viscosity between a preform rod and a glass tube by injecting a glass forming material into a gap between them, in a furnace and overcladding apparatus according to a second embodiment of the present invention.

A preform rod 100 is fabricated by outside deposition or inside deposition, and glass tube 102 is a natural quartz tube or a synthesized quartz tube having an inner diameter of 10 mm or above and a large outer diameter. Then, preform rod 100 is clamped in top chuck 20 and made vertical. One end of glass tube 102 is connected to a support tube 103, support tube 103 is mounted in bottom chuck 30, and glass tube 102 is made vertical, leaving a gap 108 between preform rod 100 and the glass tube 102. Then, preform rod 100 fixed to the top chuck 20 is moved down to be coaxially inserted into glass tube 102 under the control of the controller. A hot zone of furnace 50 is positioned around a predetermined portion of glass tube 102 having preform rod 100 inserted therein by moving carriage 60 under the control of the controller. A power supply voltage is supplied to furnace 60 and, as shown in FIG. 4, an inert gas such as Ar, He, or N is injected into gap 108 at 5–10 LPM by a rotary union 106, while preform rod 100 and glass tube 102 are being rotated in chucks 20 and 30. When the surface of glass tube 102 reaches 1700° C., burner 40 decreases its heat temperature with oxygen at 5 LPM and hydrogen at 10 LPM and heats the surface of glass tube 102, while moving carriage 60 down at a velocity of 3–5 CPM. Then, the inner surface of glass tube 102 is heated by heat transfer from the outer surface thereof and the inert gas, thus burning away microdust particles stuck on the inner surface thereof. Microdust particles are also burnt away from the outer surface of preform rod 100 which is heated by heat transfer from the inner surface and the inert gas.

Then, to control the viscosity at the interface between glass tube 102 and preform rod 100, a glass forming material 110 is injected into the gap 108 together with SiCl$_4$. That is, a mass flow controller 104 supplies SiCl$_4$ at 500 milligrams per minute (mg/min) and POCl$_3$ at 30 mg/min, or both gases and freon or/and boron at a predetermined rate to rotary union 106. Then, rotary union 106 mixes the SiCl$_4$ with the glass forming material 110 and injects the mixture into gap 108.

The SiCl$_4$ and glass forming material 110 are combined as in the following chemical formula, and controls the viscosity at the interface.

(Chemical Formula)

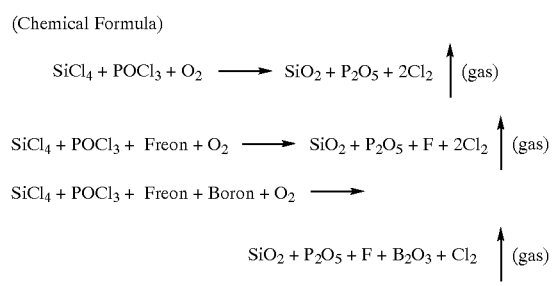

A silica layer having a matching viscosity is slowly deposited by heating the SiCl$_4$ and the glass forming material 110 in gap 108. Here, the surface of glass tube 102 is heated at 1800° C. and the downward velocity of burner 40 is 1.5–2 CPM.

Next, the predetermined portion of glass tube 102 is preheated for 10–30 minutes by supplying an inert gas into the furnace 50 while glass tube 102 and the preform rod 100 are synchronously rotated at 20–30 rpm in chucks 20 and 30. At this time, the burner 40 above the furnace 50 is lit with hydrogen at 30 LPM and oxygen at 15 LPM.

When the preheated portion of the glass tube 102 drops in viscosity and is softened, air is sucked away from gap 108 between preform rod 100 and glass tube 102 by driving vacuum pump 114 under the control of the controller, completely sealing one end of preform rod 100 in glass tube 102. Then, carriage 60 is moved down at a slightly increasing velocity from 1 CPM to 3–5 CPM and, simultaneously, the oxygen and hydrogen flow rates of burner 40 are increased to 75 LPM and 150 LPM, respectively, so that glass tube 102 is collapsed onto the whole length of preform rod 100, while they are rotated at a predetermined peripheral velocity. Furnace 50 is then turned off, and burner 40 is disposed around the connection portion between glass tube 102 and support tube 103 and softens the connection portion at 75 LPM of oxygen and 150 LPM of hydrogen for 3–5 minutes. When the connection portion between the support tube 103 and the glass tube 102 is softened, the connection portion becomes thin by slowly moving top chuck 20 upwards at 1–3 mm/min. When the outer diameter of a preform under fabrication reaches ⅔rds of the outer diameter of completed preform 112, preform 112 collapsed in support tube 103 is completely removed from support tube 103 by rapidly moving top chuck 20 upwards using manipulation unit 54 and cooled down in a retainer for a predetermined time. Thus, the overcladding process is over. In the overcladding method, the thus-fabricated preform 112 absorbs external impacts and the interface between preform rod 100 and glass tube 102 is stress-relieved.

Figure 5:
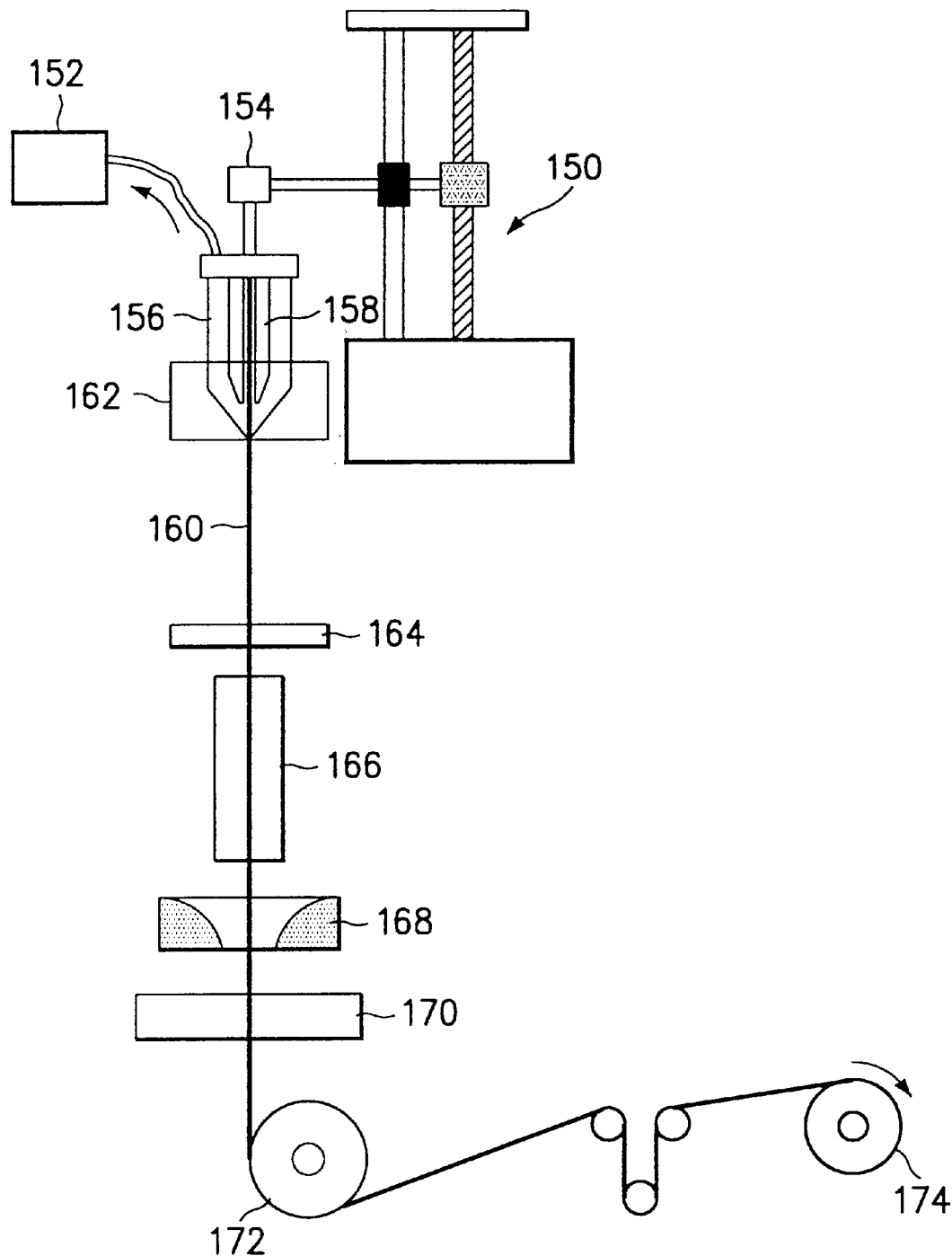
FIG. 5 is a view which depicts a process of drawing an optical fiber successively using a furnace, according to a third preferred embodiment of the present invention.

FIG. 5 is a view which depicts a method for drawing an optical fiber successively using a furnace without a separate overcladding process according to a third embodiment of the present invention. In the optical fiber drawing method, a preform rod 158 is inserted into a glass tube 156, while being made vertical. With lower ends thereof sealed together, the combined preform rod 158 and glass tube 156 are clamped in a chuck 154 provided in a feed module 150 of the optical fiber drawing apparatus.

Then, the unsealed ends of preform rod 158 and glass tube 156 are connected to a vacuum pump 152, and the sealed ends thereof are vertically fed into a furnace 162 to be aligned with a hot zone of furnace 162. Here, to increase thermal conductivity, furnace 162 is formed of graphite. Then, furnace 162 operates by turning on a power supply (not shown), and Ar gas is injected at about 10 LPM into furnace 162 to prevent oxidation of the graphite therein. The sealed ends of preform rod 158 and glass tube 156 are preheated by furnace 162 for about 20 minutes or longer, heated, and softened. Feed module 150 having preform rod 158 fixed thereto is operated, while applying a pressure of about −700 mm from vacuum pump 152 to the gap between glass tube 156 and preform rod 158.

Thus, an optical fiber 160 having an outer diameter of 125 μm is drawn from the lower portion of furnace 162, and a collapse process continues, while preform rod 158 and glass tube 156 are being sealed by heating glass tube 156 in the hot zone of the furnace 162 and applying the negative pressure from vacuum pump 152. Feed module 150 feeds preform rod 158 and glass tube 156, which are not yet sealed, downward into furnace 162, as long as optical fiber 160 is being drawn.

An outer diameter measuring instrument 164 measures the diameter of optical fiber 160 to determine whether the diameter is a predetermined value, generally, 125 μm, and notifies a diameter controller (not shown) of the measurement. Then, the diameter controller controls a capstan 176 to maintain the diameter of optical fiber 160 to be 125 μm and capstan 176 controls the tension of optical fiber 160 under the control of the diameter controller. To protect optical fiber 160 rapidly cooled down in a cooler 166, the descending optical fiber 160 is coated with acrylic resin or silicon resin in a coating unit 168. The coated optical fiber 160 is cured by an ultraviolet curer 170, and wound around a spool 174 by the drawing force of the capstan 172. Thus, the optical fiber drawing process is completed.

As described above, the optical fiber preform rod overcladding method and apparatus, and the optical fiber drawing method according to the present invention have the following advantages.

(1) Non-uniform temperature distribution on the surface of a glass tube is prevented and the glass tube can be uniformly and stably collapsed by transfering sufficient heat to the surface thereof with a furnace having a wider hot zone than an oxygen-hydrogen burner in prior art.

(2) The viscosities of a preform rod and a large-diameter glass tube at their interface are equal to each other with sufficient heat energy, thereby remarkably reducing microbending loss.

(3) The surface of the preform rod may be contaminated by contaminants of the oxygen-hydrogen burner during a prior process, whereas the surface thereof can be protected against the contaminants using oxygen and hydrogen at different low flow rates (i.e., 100 LPM and 200 LPM, respectively). Therefore, a highly strong optical fiber can be fabricated.

(4) A preform can be fabricated to be concentric in its cross section with a uniform temperature distribution in the furnace because the surface of the large-diameter glass tube is heated by the furnace and collapsed by the pressure of the oxygen-hydrogen burner.

(5) The collapse rate of the glass tube may be increased by as much as five times due to a larger amount of total heat supply than in the prior art, processing can be automated, and an optical fiber fabrication time can be remarkably reduced.

(6) Any preform rod can be overclad regardless of its size.

(7) The collapse process is facilitated by means of a vacuum pump, and the interface between the preform rod and the glass tube is stress-relieved by flowing $SiCl_4$ & $O_2$ and a glass forming material $POCl_3$, boron, or freon through a gap therebetween, thus enabling deposition of a contact material.

(8) An optical fiber can be successively drawn without an overcladding process because the furnace of the present invention is provided in a location where a preform rod is installed in an optical fiber drawing apparatus. As a result, a fabrication time is remarkably reduced and product yield is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber rod overcladding apparatus comprising:
   a vertical lathe;
   two chucks each installed at opposite ends of the vertical lathe;
   a carriage in the vertical lathe, for vertically moving between both ends of the vertical lathe;
   an oxygen-hydrogen burner installed in the carriage;
   a furnace installed in the carriage;
   a vacuum pump provided at one end of the vertical lathe;
   a coupler for connecting the vacuum pump to the one end of the vertical lathe; and
   a controller outside the vertical lathe, for controlling the vertical movement of the carriage, the flow rate of the oxygen-hydrogen burner, and the rotation of the chucks,
   wherein the furnace preheats or heats a glass tube to overclad a preform rod with the glass tube.

2. The optical fiber preform rod overcladding apparatus as claimed in claim 1, wherein the furnace is disposed below the burner in the carriage.

3. The optical fiber preform rod overcladding apparatus as claimed in claim 1, wherein the furnace receives a power supply voltage from a power supply and has a graphite heat emitting body.

4. The optical fiber preform rod overcladding apparatus as claimed in claim 1, wherein the furnace prevents oxidation of the preform rod and the glass tube, using an inert gas which is one of helium (He), argon (Ar), a mixture of helium and argon, and nitrogen ($N_2$).

5. A method for overcladding an optical fiber preform rod in an optical fiber preform rod overcladding apparatus having a vertical lathe including top and bottom chucks, a ring-shaped oxygen-hydrogen burner, a furnace for heating or preheating a glass tube, and a carriage for vertically moving between both chucks, a vacuum pump disposed at one end of the vertical lathe, a coupler connected between the vacuum pump and one of the chucks, and a controller for controlling for the vertical movement of the carriage, the flow rate of the oxygen-hydrogen, and the rotation of the chucks, the method comprising the steps of
   clamping the preform rod in the top chuck and making vertical the preform rod;
   connecting a glass tube to a support tube;
   mounting the support tube in the bottom chuck and making vertical the glass tube;
   coaxially inserting the preform rod into the glass tube by lowering the top chuck;
   preheating the glass tube by utilizing the furnace and heating the glass tube by utilizing the burner until the glass tube reaches a softening point; and
   completely sealing the preform rod in the glass tube by sucking air from a gap between the preform rod and the glass tube by application of a negative vacuum pressure, to thereby complete a preform.

6. The method as claimed in claim 5, wherein the preform rod is fabricated by one of outside deposition and inside deposition.

7. The method as claimed in claim 5, wherein the glass tube is one of a synthesized quartz tube and a natural quartz tube.

8. The method as claimed in claim 7, wherein the glass tube has an inner diameter equal to or greater than 10 mm.

9. The method as claimed in claim 5, wherein foreign materials are removed from the gap between the preform rod and the glass tube by injecting an inert gas thereinto.

10. The method as claimed in claim 9, wherein any of said foreign material which may be stuck to an outer surface of the preform rod are removed by heat transferred from the glass tube and the inert gas.

11. The method as claimed in claim 9, wherein any of said foreign material which may be stuck to an inner surface of the glass tube are removed by heat generated from one of the furnace and the burner and the inert gas.

12. The method as claimed in claim 9, wherein the inert gas is one of helium (He), argon (Ar), a mixture of helium and argon, and nitrogen ($N_2$).

13. A method for overcladding an optical fiber preform rod in an optical fiber preform rod overcladding apparatus having a vertical lathe including top and bottom chucks, a ring-shaped oxygen-hydrogen burner, a furnace for heating or preheating a glass tube, and a carriage for vertically moving between both chucks, a vacuum pump disposed at one end of the vertical lathe, a coupler connected between the vacuum pump and one of the chucks, and a controller for controlling for the vertical movement of the carriage, the flow rate of the oxygen-hydrogen, and the rotation of the chucks, the method comprising the steps of:
   clamping the preform rod in the top chuck and making vertical the preform rod;
   connecting a glass tube to a support tube;
   mounting the support tube in the bottom chuck and making vertical the glass tube;
   coaxially inserting the preform rod into the glass tube by lowering the top chuck;
   depositing a silica layer having a matching viscosity in a gap between the preform rod and the glass tube, while controlling the viscosity of the preform rod and the glass tube by injecting $SiCl_4$ and a glass forming material into the gap between the preform rod and the glass tube;
   preheating the glass tube by the furnace and heating the glass tube by the burner until the glass tube reaches a softening point; and
   completely sealing the preform rod in the glass tube by sucking air in the clearance between the preform rod and the glass tube by application of a negative vacuum pressure, to thereby complete a preform.

14. The method as claimed in claim 13, wherein the glass forming material is one of $POCl_3$, freon, and boron having a low viscosity.

15. The method as claimed in claim 13, wherein $SiCl_4$ and $POCl_3$ are injected into the gap between the preform rod and the glass tube.

16. The method as claimed in claim 13, wherein $SiCl_4$, $POCl_3$, and freon are injected into the gap between the preform rod and the glass tube.

17. The method as claimed in claim 13, wherein $SiCl_4$, $POCl_3$, freon, and boron are injected into the gap between the preform rod and the glass tube.

18. An optical fiber drawing method comprising the steps of:
   sealing one end of a preform rod to one end of a glass tube;
   clamping an unsealed end of the preform rod and an unsealed end of the glass tube in a chuck provided to a feed module in an optical fiber drawing apparatus;
   connecting a vacuum pump to the unsealed ends of the preform rod and glass tube;

aligning the sealed ends of the preform rod and the glass tube in a hot zone of a furnace in the optical fiber drawing apparatus;

collapsing the glass tube onto the preform rod by preheating the sealed ends of the preform rod by utilizing the furnace, heating the sealed ends with a burner until the sealed ends thereof are softened, and removing air from a gap between the preform rod and the glass tube by utilizing the vacuum pump, thereby forming a preform;

drawing an optical fiber from the preform by utilizing the furnace to heat the preform; and measuring an outer diameter of the optical fiber drawn from the furnace;

cooling the optical fiber after the measuring step; and coating the optical fiber with a curing resin, following the cooling step.

19. The optical fiber drawing method as claimed in claim 18, wherein the furnace is formed of graphite.

20. The optical fiber drawing method as claimed in claim 19, wherein an argon gas is injected into the furnace.

21. The optical fiber drawing method as claimed in claim 19, wherein the feed module in the optical fiber drawing apparatus moves the preform rod and the glass tube downward as long as the optical fiber is being drawn.

* * * * *